United States Patent
Falco, Jr. et al.

(10) Patent No.: US 9,330,466 B2
(45) Date of Patent: May 3, 2016

(54) METHODS AND APPARATUS FOR 3D CAMERA POSITIONING USING A 2D VANISHING POINT GRID

(71) Applicant: Adobe Systems Incorporated, San Jose, CA (US)

(72) Inventors: Peter F. Falco, Jr., Saratoga, CA (US); Radomir Mech, Mountain View, CA (US); Nikolai A. Svakhin, San Jose, CA (US); Zorana Gee, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 135 days.

(21) Appl. No.: 13/689,319

(22) Filed: Nov. 29, 2012

(65) Prior Publication Data

US 2013/0243306 A1    Sep. 19, 2013

Related U.S. Application Data

(60) Provisional application No. 61/612,847, filed on Mar. 19, 2012.

(51) Int. Cl.
*G06K 9/00* (2006.01)
*G06T 7/00* (2006.01)
*G06T 15/20* (2011.01)
*G06T 19/00* (2011.01)

(52) U.S. Cl.
CPC .............. *G06T 7/0042* (2013.01); *G06T 15/20* (2013.01); *G06T 19/006* (2013.01)

(58) Field of Classification Search
USPC ........................................ 382/154; 345/419
See application file for complete search history.

(56) References Cited

U.S. PATENT DOCUMENTS 8,705,892 B2*   4/2014   Aguilera et al. ............... 382/285
2008/0018668 A1*  1/2008   Yamauchi ..................... 345/633
2012/0070101 A1   3/2012   Kogan et al.

OTHER PUBLICATIONS

Horry, Youichi, Ken-Ichi Anjyo, and Kiyoshi Arai. "Tour into the picture: using a spidery mesh interface to make animation from a single image." Proceedings of the 24th annual conference on Computer graphics and interactive techniques. ACM Press/Addison-Wesley Publishing Co., 1997. pp. 1-9.
"Use Vanishing Point to edit images in perspective", Adobe Studio on Adobe Photoshop CS2, 2005, Adobe Systems Incorporated. Web article pp. 1-3.

* cited by examiner

*Primary Examiner* — Ishrat I Sherali
(74) *Attorney, Agent, or Firm* — Wolfe-SBMC

(57) ABSTRACT

Methods and apparatus for three-dimensional (3D) camera positioning using a two-dimensional (2D) vanishing point grid. A vanishing point grid in a scene and initial camera parameters may be obtained. A new 3D camera may be calculated according to the vanishing point grid that places the grid as a ground plane in a scene. A 3D object may then be placed on the ground plane in the scene as defined by the 3D camera. The 3D object may be placed at the center of the vanishing point grid. Once placed, the 3D object can be moved to other locations on the ground plane or otherwise manipulated. The 3D object may be added as a layer in the image.

20 Claims, 11 Drawing Sheets

METHODS AND APPARATUS FOR 3D CAMERA POSITIONING USING A 2D VANISHING POINT GRID

PRIORITY INFORMATION

This application claims benefit of priority of U.S. Provisional Application Ser. No. 61/612,847 entitled "Methods and Apparatus for 3D Camera Positioning Using a 2D Vanishing Point Grid" filed Mar. 19, 2012, the content of which is incorporated by reference herein in its entirety.

BACKGROUND

A task in the field of digital image processing is placing digital objects, for example three-dimensional (3D) renderings of objects, into scenes, for example digital or digitized photographs. However, placing 3D objects into a two-dimensional (2D) scene (e.g., a digital photograph of a scene) so that the objects appear realistically in the scene can be a difficult task. A step in this process is to try to match the camera parameters (e.g., camera location, orientation and field of view) of the 3D camera to the digital photograph's camera. Conventionally, this matching has involved the photographer, graphics artist, or other user manually trying to match the 3D camera to the digital photograph's camera.

SUMMARY

Various embodiments of methods and apparatus for three-dimensional (3D) camera positioning using a two-dimensional (2D) vanishing point grid are described. In embodiments, a 2D vanishing point grid is obtained. From the vanishing point grid, a field of view, and a current camera location, a new 3D camera is calculated that places the vanishing point grid on the ground (i.e., as a ground plane). 3D objects can then be placed on the ground plane.

In at least some embodiments, a vanishing point grid in a scene and initial camera parameters may be obtained. A new 3D camera may be calculated according to the vanishing point grid that places the grid as a ground plane. A 3D object may then be placed on the ground plane as defined by the 3D camera. In at least some embodiments, the 3D object is placed at the center of the vanishing point grid. In at least some embodiments, once placed, the 3D object can then be moved to other locations on the ground plane or otherwise manipulated (e.g., resizing, rotating, etc.) In at least some embodiments, the 3D object is added as a layer in the image. Additional 3D objects can be placed on the ground plane and similarly manipulated.

Embodiments may compute an approximate camera position for a 3D space, using a vanishing point grid as a facilitator. To accomplish this, in at least some embodiments, a vanishing point grid and initial camera parameters are obtained. Based on the input, ground plane orientation calculations are performed. In at least some embodiments, these calculations involve calculating vanishing point vectors in 3D space, calculating a vanishing plane normal (up-vector), and calculating new X and Z vectors. Camera orientations are computed. In at least some embodiments, these computations involve calculating a ground plane transformation matrix with respect to a world-up vector, and calculating a camera matrix from the ground plane transformation matrix. Finally, a camera position is calculated according to one or more conventions, and a 3D object is placed in the scene according to the calculated camera position.

Figure 1:
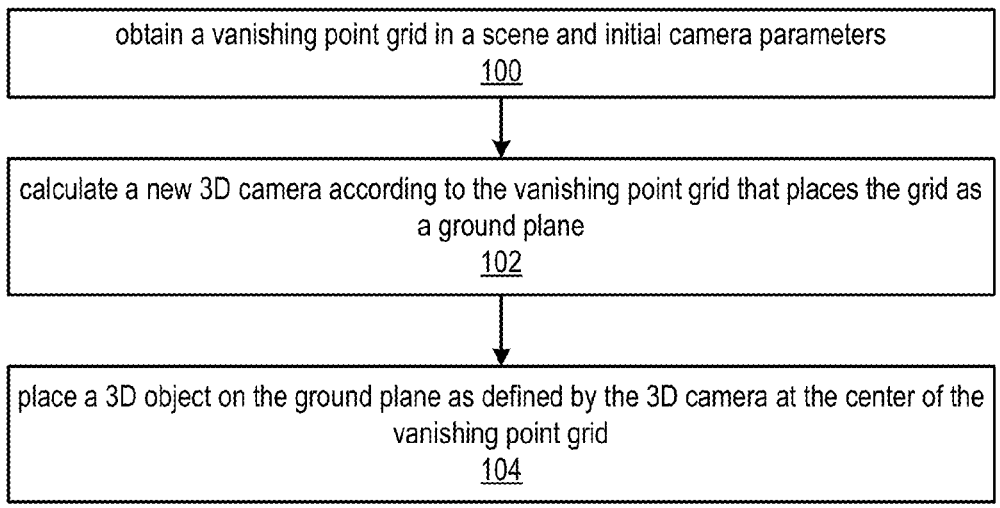
FIG. 1 is a high-level flowchart of a method for three-dimensional (3D) camera positioning using a two-dimensional (2D) vanishing point grid, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for three-dimensional (3D) camera positioning using a two-dimensional (2D) vanishing point grid are described. In embodiments, a 2D vanishing point grid is obtained. From the vanishing point grid, a field of view, and a current camera location, a new 3D camera is calculated that places the vanishing point grid on the ground (i.e., as a ground plane). One or more 3D objects can then be placed on the ground plane.

Embodiments may leverage vanishing point planes that may be generated according to vanishing point technology of a digital image processing application. The vanishing point technology allows the user to define 2D perspective planes (vanishing point planes) in digital images via a user interface. For example, to create a perspective plane, the user may select a vanishing point tool and use the tool to specify four points in the image to thus define the plane. However, previous applications of vanishing point planes have typically been limited to 2D imaging tasks. Embodiments may leverage a vanishing point grid as input to a method for generating a 3D camera that orients the vanishing point grid as a ground plane, which allows the user to place 3D objects into the scene that are automatically "snapped" to the ground plane.

FIG. 1 is a high-level flowchart of a method for 3D camera positioning using a 2D vanishing point grid, according to at least some embodiments. As indicated at 100, a vanishing point grid in a scene and initial camera parameters may be obtained. As indicated at 102, a new 3D camera may be calculated according to the vanishing point grid that places the grid as a ground plane. As indicated at 104, a 3D object may then be positioned and placed on the ground plane as defined by the 3D camera. In at least some embodiments, the 3D object is placed at the center of the vanishing point grid. In at least some embodiments, once placed, the 3D object can then be moved to other locations on the ground plane or otherwise manipulated (e.g., resizing, rotating, etc.) Each of the elements in FIG. 1 is described in more detail below.

Embodiments may compute an approximate camera position for a 3D space, using a vanishing point grid as a facilitator. To accomplish this, in at least some embodiments, a vanishing point grid and initial camera parameters are obtained. Based on the input, ground plane orientation calculations are performed, camera orientations are computed, and camera position is calculated according to one or more conventions. The following is a general description of the method according to at least some embodiments, and is not intended to be limiting. The method is described in more detail below in relation to FIGS. 2 through 5.

Computing Orientations

The following broadly describes computing the orientations, according to at least some embodiments.

Vanishing points are converted from screen coordinates to world coordinates, and then projected onto the focal plane of the camera. In at least some embodiments, the camera may be assumed to be at location (0,0,0), and the plane at −(focal distance). Note that this will not be correct if the image has been cropped irregularly and the camera is not at the center of the image any more. In at least some embodiments, instead of assuming the camera is at (0,0,0), the camera's current location may be used as an initial guess. This may, for example, reduce the change that occurs when the method is applied after a 3D model has already been loaded.

Two vanishing point vectors may then be obtained. The vanishing plane may be defined by the vanishing point vectors and the camera location. The normal of the vanishing plane is obtained. The normal is made to point up if it does not. This normal is the new up vector in the camera space.

If the new camera is to be aligned with the old camera, the old camera X vector and old camera Z vector are obtained. A new Z vector is obtained from the old X vector and the new up vector. If the new Z vector does not point in the same half-plane as the old Z vector, the new Z vector is flipped. A new X vector is obtained from the new Z vector and the new up vector. If the new X vector does not point in the same half-plane as the old X vector, the new X vector is flipped.

If the new camera does not need to be aligned with the old camera, any two vectors, new X vector and new Z vector, may be chosen that are perpendicular to the new up vector and to each other. A new ground plane transformation matrix is obtained from the new X vector, new up vector, and new Z vector. The new ground plane transformation matrix is inverted. This is the new camera matrix. At this point, the orientation is computed. Next, the camera position needs to be set.

Computing Camera Position

The following broadly describes computing the camera position, according to at least some embodiments.

An offset needs to be calculated by which the camera is moved from the scene center along the view direction. The scene center may be computed from the scene and the current object transformation matrix. The view direction may be obtained from the camera matrix, which was previously computed as noted above. The offset may be computed in different ways, depending on whether the camera was aligned with the old camera. If the camera was aligned with the old camera, the offset is the distance between the scene center and the old camera position in world coordinates. Otherwise, in at least some embodiments, the offset may be calculated by multiplying the scene bounding box diagonal by a specified value. This value may need to be at least greater than 1, and generally may be at least 1.4. In at least some embodiments, the camera position may then be obtained as scene center−(offset*view direction).

Method Details

FIGS. 2 through 5 and the following discussion provide details of a method for computing approximate camera position for a 3D space using a vanishing point grid as a facilitator, and for positioning 3D objects in the space, according to at least some embodiments. The following discussion includes pseudocode for implementing example algorithms, which is not intended to be limiting. The discussion and pseudocode may refer to the following mathematical operations as defined below:

tan(A)—tangent of angle A.
A.x—x-component of the vector A.
(A|B|C)—matrix composed of column-vectors A, B, and C.
(A×B)—cross product of vectors A and B.
(A*d*B)—dot-product of vectors A and B.
det(A)—determinant of angle A.
Invert(A)—matrix, an inverse of matrix A.
normalize(A)—vector, normalized vector A.

Figure 2:
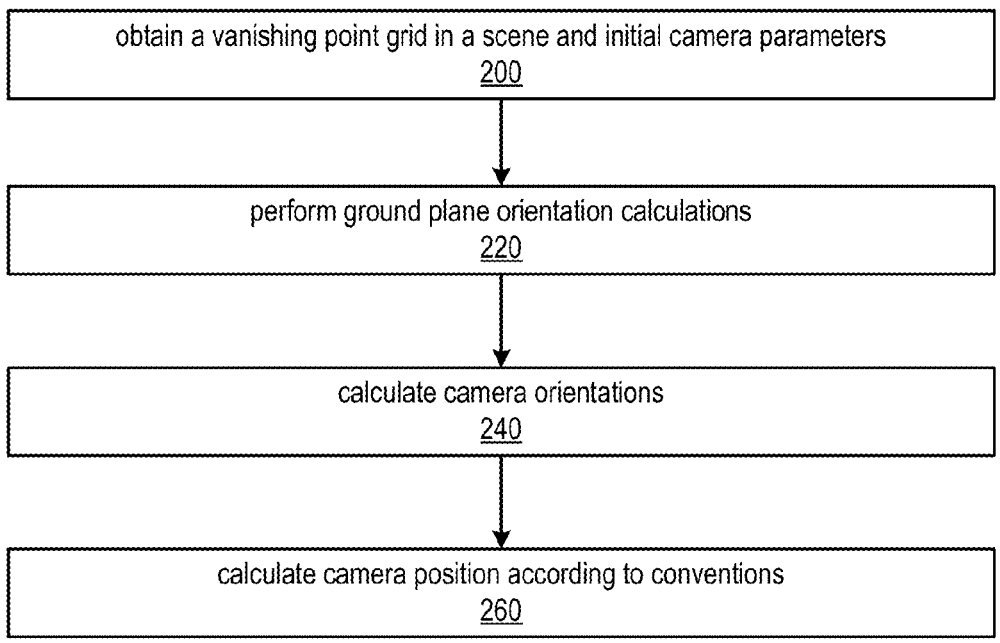
FIGS. 2 through 5 are flowcharts of methods for computing approximate camera position for a 3D space using a vanishing point grid as a facilitator, and for positioning 3D objects in the space, according to at least some embodiments.

FIG. 2 is a high-level flowchart of a method for computing approximate camera position for a 3D space using a 2D vanishing point grid as a facilitator, according to at least some embodiments. Input including but not limited to a vanishing point grid and initial camera parameters are obtained, as indicated at 200. As indicated at 220, based on the input, ground plane orientation calculations are performed. As indicated at 240, camera orientations are computed. As indicated at 260, camera position is calculated according to one or more conventions.

The following discussion describes each element of FIG. 2 in more detail.

Inputs to and Output of the Method

Inputs to the method may include one or more of, but are not limited to:

Grid points P1, P2, P3, P4 in the document coordinate system.
Vanishing points VP1 and VP2 in the document coordinate system.
A 3D object.
Old camera position in the 3D world coordinate system. In at least some embodiments, if a 3D object is being loaded, a default camera position may be used.

Output of the method may include a new camera position and orientation in the 3D world coordinate system.

Assumptions

In at least some embodiment, one or more of the following may be assumed.

The camera has a vertical field of view of FOV (field of view) degrees.
A projection center (image center) is in the center of the document.
The vanishing point data is valid (i.e. points are not collinear, not collapsed into a single point, etc.)
The document coordinate system is: top left is (0, 0), bottom right is (width, height) where width is image width, etc.

Figure 3:
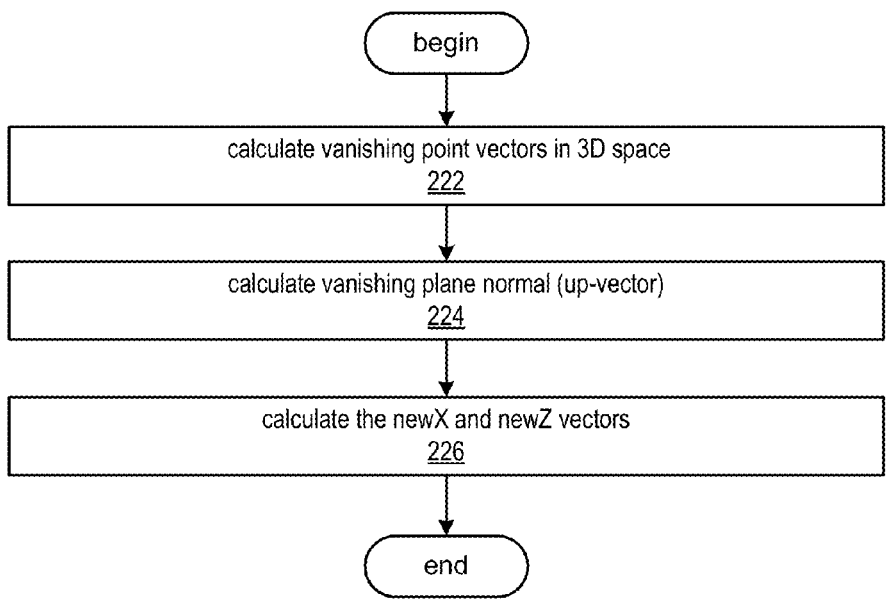
Figure 4:
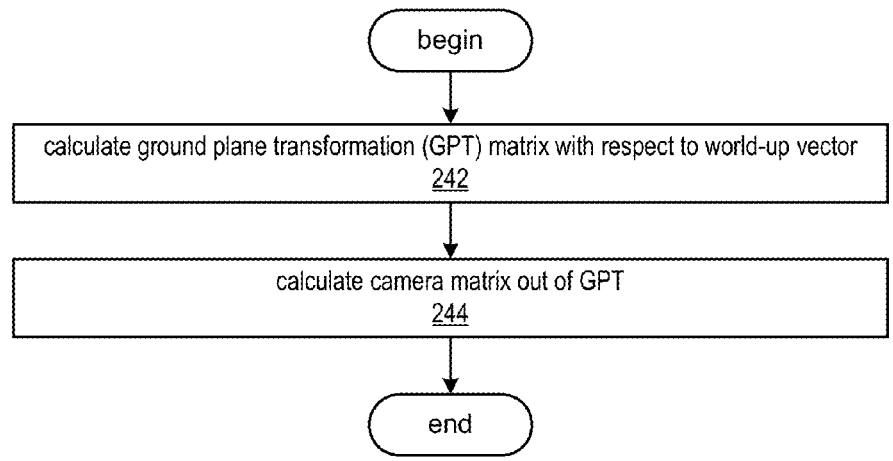
Figure 5:
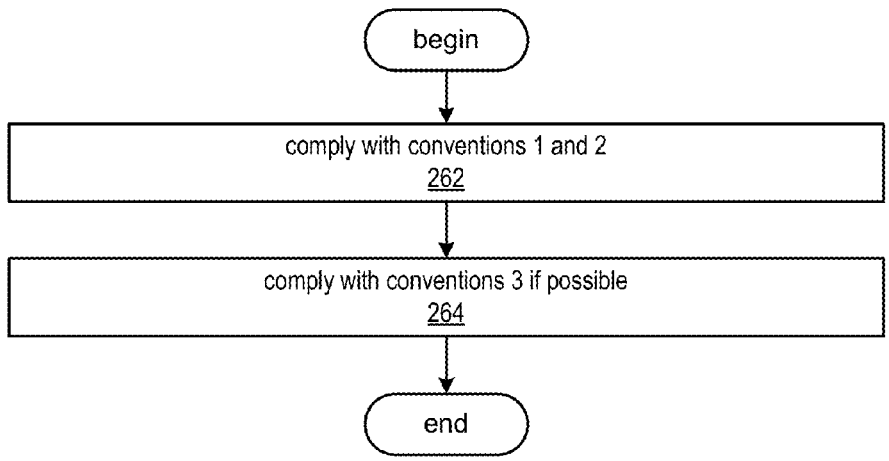

In at least some embodiments, the overall method may be split into three sub-methods or algorithms corresponding to elements 220, 240, and 260 of FIG. 2. FIG. 3 is a flowchart of element 220 in more detail, FIG. 4 is a flowchart of element 240 in more detail, and FIG. 5 is a flowchart of element 260 in more detail.

Ground Plane Orientation Calculation Algorithm

As indicated at 220 of FIG. 2, ground plane orientation calculations are performed. In at least some embodiments, the ground plane orientation calculations may be performed according to the following algorithm. In at least some embodiments, this algorithm may make one or more of the following assumptions.

A first assumption is that this algorithm works in the "camera coordinate system" in which:

Camera (center of projection) is at 0,0,0:
View direction in the camera coordinate system is (0, 0, −1). The focal plane will be orthogonal to view direction, passing through the point of (0, 0, −1);
The positive Y direction (0, 1, 0) is up in a camera coordinate system.

A second assumption is that the ground plane orientation is described via its orthonormal basis (newX, newY, newZ), where newY is its normal. (newY has been previously referred to herein as the "new up vector").

Referring to FIG. 3, as indicated at 222, vanishing point vectors may be calculated in 3D space. A vanishing point vector may be defined as a vector starting from projection center (0, 0, 0) in the direction of the vanishing point. The following is example pseudocode of an algorithm that may be used for this calculation in at least some embodiments, and is not intended to be limiting:

scale=tan(FOV/2)/(height/2);

IC.x=width/2;

IC.y=height/2;

VPV1.x=scale*(VP1.x−IC.x);

VPV1.y=scale*(VP1.y−IC.y);

VPV1.z=−1;

VPV2.x=scale*(VP2.x−IC.x);

VPV2.y=scale*(VP2.y−IC.y);

VPV2.z=−1;

Note that FOV indicates field of view, IC indicates image center, VP indicates a vanishing point, and VPV indicates a vanishing point vector. Note that there are two vanishing points (VP1 and VP2) and two vanishing point vectors (VPV1 and VPV2).

As indicated at 224 of FIG. 3, the vanishing plane normal (up-vector) may be calculated. In at least some embodiments, this may be performed according to the following algorithm.

A vanishing point plane (VPN) may be defined as a plane formed by two vanishing point vectors (VPV1 and VPV2):

VPN=VPV1×VPV2

The normal for the vanishing point plane can point in both directions (above or below the plane). According to the first assumption, the above direction would be the same direction as (0, 1, 0):

VPNup=VPN if (VPN.y>=0)−VPN if (VPN.y<0)

The VPNup may now serve as a Y-up vector for the new ground plane.

newY=VPNup

As indicated at 226 of FIG. 3, the newX and newZ vectors may be calculated. In at least some embodiments, this may be performed according to the following algorithm.

Note that the set of possible newX and newZ, orthogonal to the newY and to each other, is essentially infinite. The ground plane can be spun around its up-vector however is desired, and newX and newZ will stay in the original plane. In at least some embodiments, to solve this gracefully (minimizing the transition from the current state), the OLD ground plane orientation (oldX, oldY, oldZ) may be used as an initial guess.

The following is pseudocode of an algorithm that calculates newX and newZ vectors so that they are as close to the oldX and oldZ as possible, while being orthogonal to the newY. Note that this pseudocode and algorithm are not intended to be limiting; newX and newZ may be calculated using other techniques.

```
newZ = oldX × newY;
    if (newZs.length == 0) goto fallback;
if (newZ *d* oldZ < 0)
{
    newZ = -newZ;
}
newX = newZ × newY;
    if (newX.length == 0) goto fallback;
if (newX *d* oldX<0)
{
    newXs = -newXs;
}
normalize(newX);
normalize(newZ);
```

In some cases (e.g., if the new ground plane is a 90-degree roll from the old ground plane) the algorithm may not work; the fallback would simply be picking a random newX vector orthogonal to newY and calculating a newZ vector orthogonal to both newX and newY. The fallback approach would still produce a viable solution, and since the ground would tumble strongly anyways, the impact of the fallback cases may be minimal.

Calculating Camera Orientation

As indicated at 240 of FIG. 2, camera orientation is calculated. In at least some embodiments, camera orientation may be calculated according to the following algorithm.

Note that the previous calculation assumed that the camera is fixed, and that the ground plane is moving. However, in the 3D world representation, it's vice-versa: the ground plane is fixed at certain position with either Y-up or Z-up world orientation, but the camera can be oriented arbitrarily.

Inputs to this algorithm may include the ground plane orientation in the camera coordinate system calculated at element 220 of FIG. 2 as described above. In at least some embodiments, input may also include a specified up-vector convention (Y-up or Z-up) that may be used to determine whether the ground plane is in XZ plane or in XY plane, respectively. Output of this algorithm is the camera orientation in the world coordinate system.

Referring to FIG. 4, as indicated at 242, a ground plane transformation matrix with respect to the world-up vector may be calculated. This calculation is given below as pseudocode for both the Y-up case and the Z-up case, and is not intended to be limiting.

Y-Up Case

In at least some embodiments, the following technique may be used to calculate the ground plane transformation matrix (GPT) with respect to the world-up vector for the Y-up case. GPT is a 3×3 matrix constructed out of the three column vectors newX, newY, newZ:

```
GPT = (newX | newY | newZ);
if (det(GPT) < 0)
{
    GPT=(-newX | newY | newZ);
}
```

Z-Up Case

In at least some embodiments, the following technique may be used to calculate the ground plane transformation matrix (GPT) with respect to the world-up vector for the Z-up case. GPT is a 3×3 matrix constructed out of three column vectors newX, newZ, newY:

```
GPT=(newX | newZ | newY);
if (det(GPT)<0)
{
    GPT=(-newX | newZ | newY);
}
```

Referring to FIG. 4, as indicated at 244, a camera matrix (CT) may be calculated from the ground plane transformation matrix (GPT). This calculation is given below, and is not intended to be limiting. Note that the calculation inverts the ground plane transformation (orientation) matrix, which gives the camera matrix:

$CT$=Invert(GPT).

Calculating the Camera Position

As indicated at 260 of FIG. 2, camera position is calculated according to one or more conventions. In at least some embodiments, camera position may be calculated according to the following algorithm.

Input to the algorithm may include the camera orientation, a 3D object, and the center point of the vanishing point grid. Output of the algorithm may include the camera position.

The two previous algorithms (elements 220 and 240 of FIG. 2) calculated just the camera orientation (up-vector+view-direction). However, in order to place the camera in a 3D space properly, its 3D position is needed. Mathematically, any 3D position would work: with fixed orientation, the perspective camera's horizon/vanishing plane stays fixed as well, regardless of the position.

However, in at least some embodiments, one or more conventions may be used for the camera that may help to narrow the space and produce a plausible 3D camera position. These conventions may include one or more of, but are not limited to:

Convention 1—The camera should match the old camera position as much as possible.

Convention 2—The camera should point at the 3D object being rendered, having it in the view.

Convention 3—The camera should be positioned in such a way that ground plane center is visually located at the center of the vanishing point grid.

By convention, the ground plane center (point GPC) may be at the bottom of the 3D object's bounding box.

Referring to FIG. 5, as indicated at 262, the algorithm may act to comply with conventions 1 and 2. In at least some embodiments, to satisfy convention 1 and 2, the distance 'd' to the 3D object center (Co) of the old camera may be calculated, and the new position (Cp) may be calculated as:

$Cp=Co-d*V;$ where V is the camera view direction (which is known from the camera orientation).

Referring to FIG. 5, as indicated at 262, the algorithm may act to comply with convention 3, if possible. In at least some embodiments, to accomplish this, the algorithm takes the document central point 'Dc', using the camera position/orientation data, and projects a ray R through this point into space. This operation may be referred to as "unprojection," since instead of projecting a 3D point onto a 2D focal plane, a 2D point on the focal plane is used to generate a ray R of all possible 3D points that would project to it using the current camera. Ray R is also sometimes referred to as an "epipolar line" of the point Dc. The above may result in two cases.

Case 1

The ray R hits the ground plane at intersection point P. In this case, the camera may be offset as follows, where GPC is the ground plane center.

For the Y-up case:

$$Cp.x = Cp.x - (P.x - GPC.x);$$

$$Cp.z = Cp.z - (P.z - GPC.z);$$

For the Z-Up case:

$$Cp.x = Cp.x - (P.x - GPC.x);$$

$$Cp.y = Cp.y - (P.y - GPC.y);$$

Case 2

The ray R does not hit the ground plane. This means that the camera is pointed upward, but the ground plane is still visible (the horizon line is in the bottom half of the image). For this case, convention 3 is not met, and the current camera calculation may be left as is.

After calculating the camera position, the 3D object may be added to the image and displayed in the scene according to the camera position. In at least some embodiments, the 3D object may be added as a layer in a layer stack of the image.

Example Workflows and User Interfaces

FIGS. 6A through 6F graphically illustrate an example workflow and example user interface for implementing and applying the methods for 3D camera positioning using a 2D vanishing point grid, according to at least some embodiments. The example user interface may be implemented in an image processing application and accessed by a user to perform a workflow that allows the user to add 3D objects to a ground plane in 2D images by leveraging a 2D vanishing point grid as described herein. Note that the workflow and user interface are given as examples, and are not intended to be limiting.

Figure 6A:
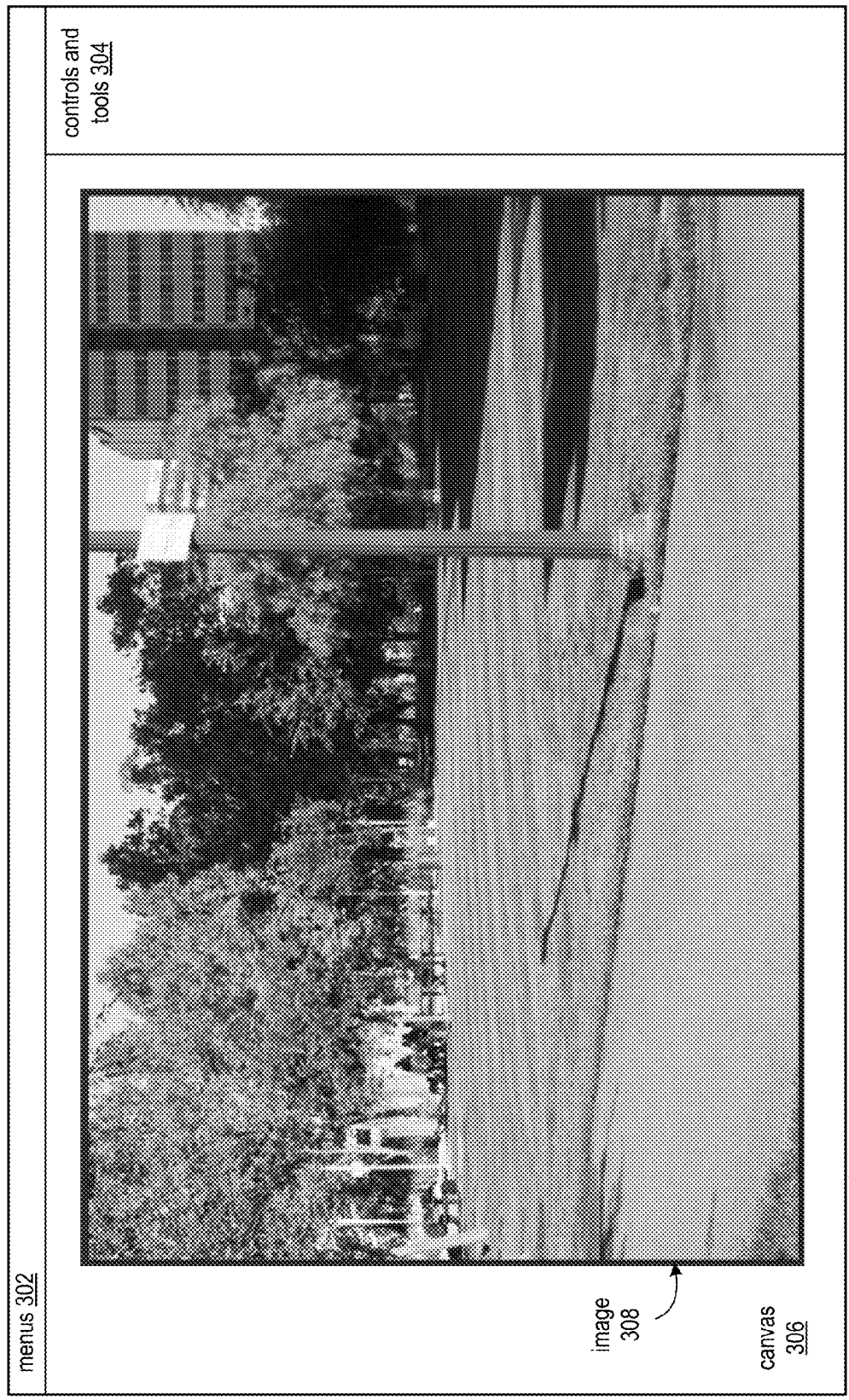
FIGS. 6A through 6F graphically illustrate an example workflow and example user interface elements for implementing and applying the methods for 3D camera positioning using a 2D vanishing point grid, according to at least some embodiments.

FIG. 6A shows an example display 300 that includes a canvas 306 area in which images may be displayed. Display 300 may also include a menus 302 area and a controls and tools 304 area. Menus 302 and controls and tools 304 may include one or more user interface elements (e.g., menus, slider bars, buttons, dials alphanumeric text entry boxes, panes, etc.) via which the user can access various image processing tools and other functionality of the application using a cursor control device (e.g., a mouse, keyboard, etc.) or alternatively using a digit, pen or stylus if display 300 is touch- or multitouch-enabled. FIG. 6A shows an example image 308 currently in canvas 306 to which the user may wish to add 3D objects.

Figure 6B:
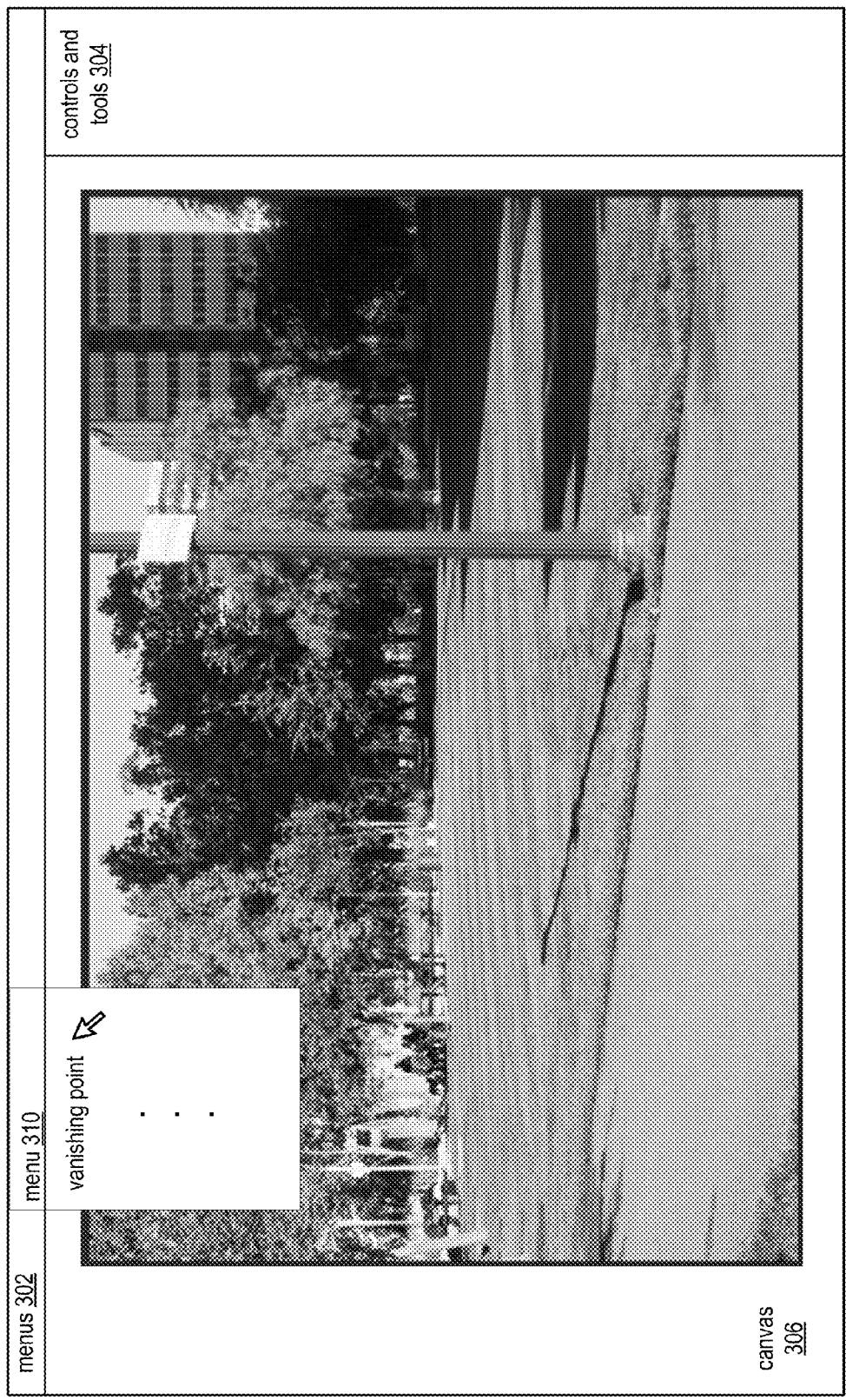

FIG. 6B shows that the user has selected a menu 310 from menus 302 area and is selecting a "vanishing point" menu item from the menu. The arrow represents the cursor. In at least some embodiments, menu 310 may be a 3D camera menu from which the user may select various camera positions for the image 308 (e.g., front left, front right, etc.). As shown in FIG. 6B, "vanishing point" may be an option in the menu that lets the user select the camera positioning technique as described herein that leverages a 2D vanishing point grid to position the camera according to a ground plane in the image 308.

Figure 6C:
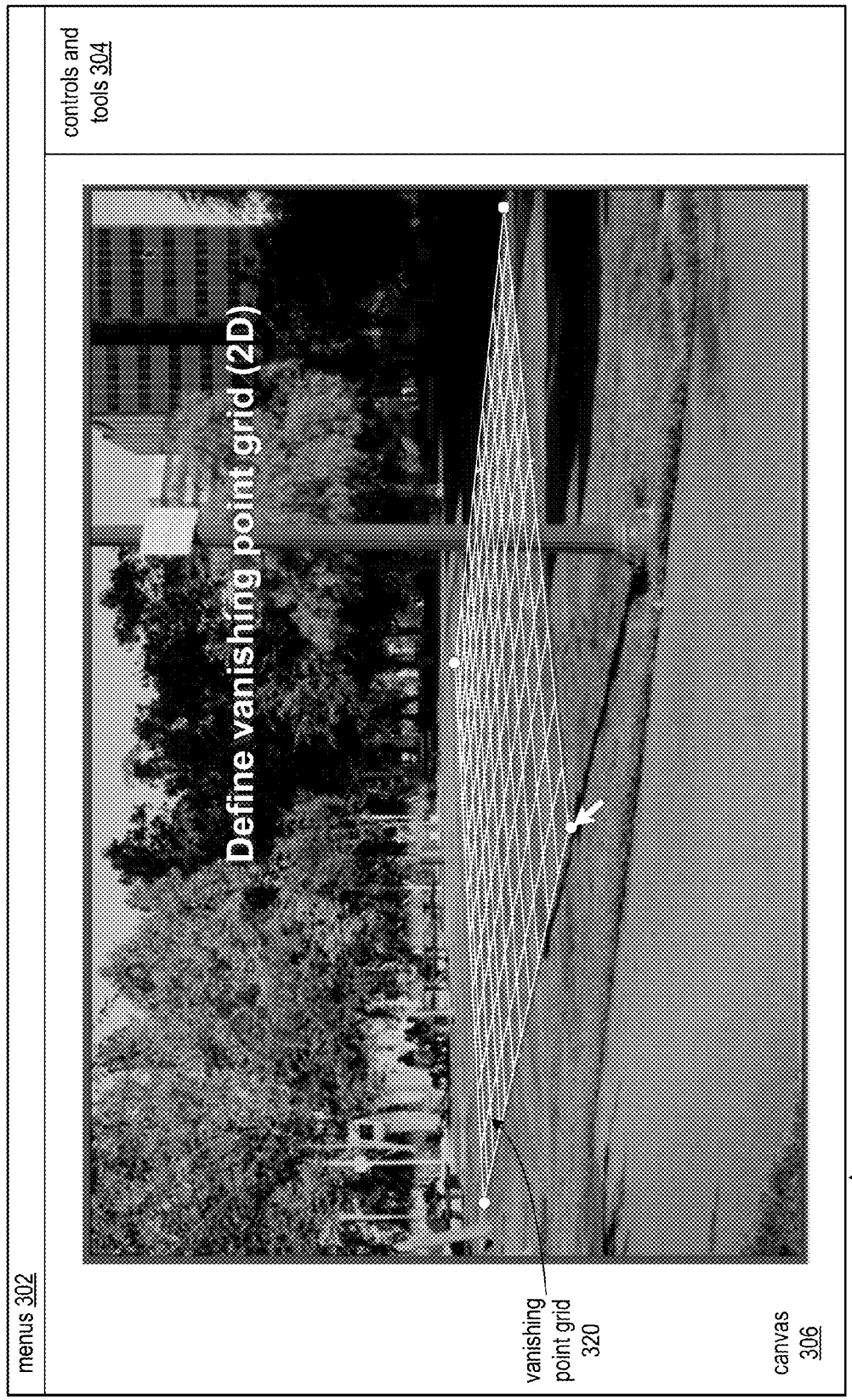

FIG. 6C shows that the user may define a 2D vanishing point grid 320 on a surface in the image 308, in this example on the ground. For example, the user may define the grid 320 by specifying the four vanishing point grid corners, represented by the white circles. If necessary, the user may adjust the grid 320 after defining the grid, for example by grabbing and dragging a corner or side via the cursor. In at least some embodiments, the grid 320 may be added as a layer to the image 308.

In at least some embodiments, after the vanishing point grid 320 is specified, the methods for performing ground plane orientation calculations and calculating camera orientations as described in reference to FIGS. 2, 3 and 4 may be automatically applied according to the parameters of the vanishing point grid 320 that the user has specified and initial camera parameters. However, note that, in at least some embodiments, these methods may not be performed until a 3D object is specified as described below.

Figure 6D:
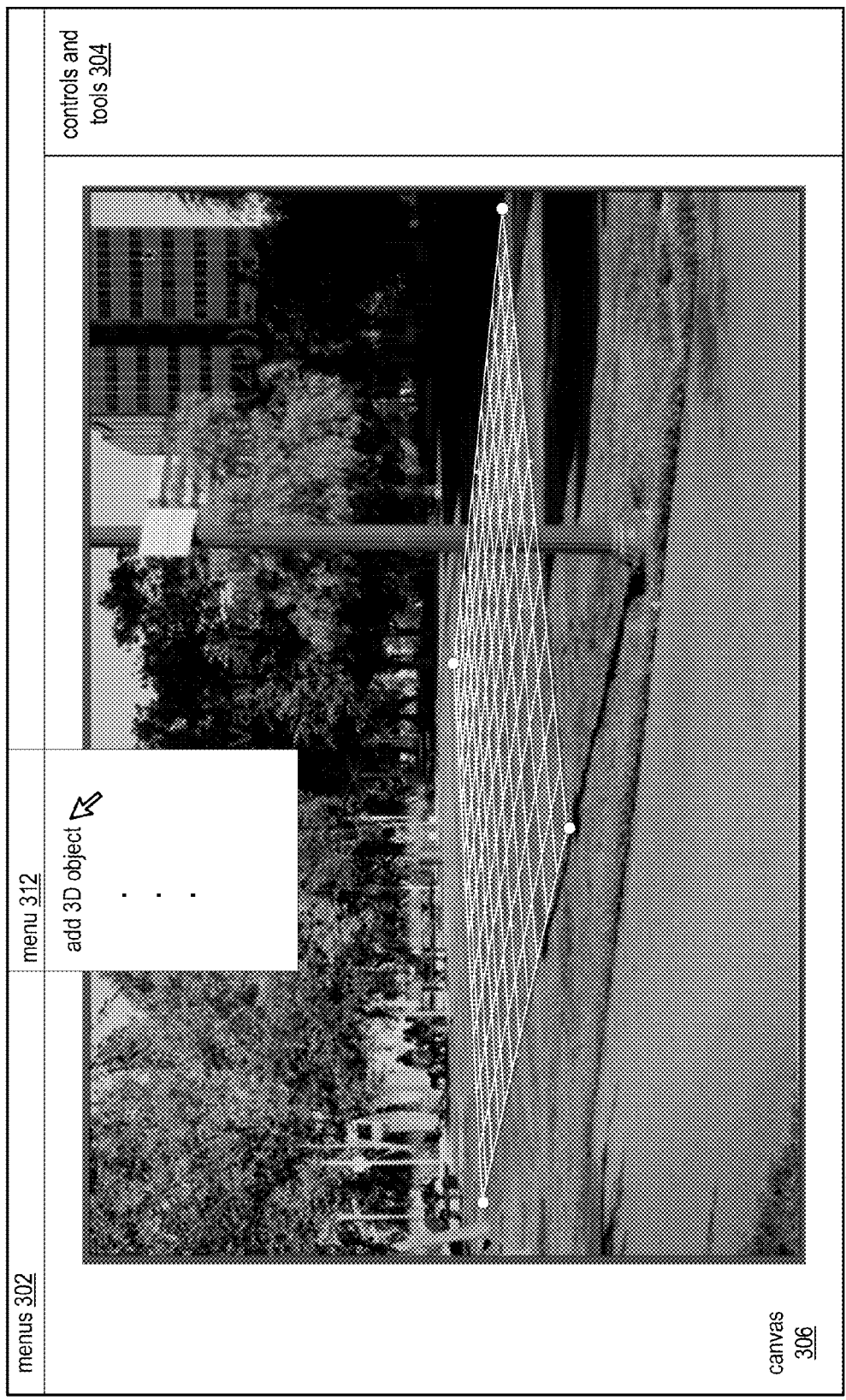

FIG. 6D shows that the user has selected a menu 312 from menus 302 area and is selecting an "add 3D object" menu item from the menu. In at least some embodiments, in response to the user selecting the "add 3D object" menu item, the application may display a user interface (e.g., a menu, dialog box, another display, etc.) that allows the user to select a particular 3D object or model that the user wants to add to the image 308. The 3D object or model may, for example, be stored in a file, and may be selected according to any one of various techniques for selecting files stored in file systems.

In at least some embodiments, after the user has specified a 3D object to be added to the image 308, the method for calculating the camera position as described in reference to FIGS. 2 and 5 may be automatically applied according to the camera orientation, the 3D object, and the center point of the vanishing point grid 320. In at least some embodiments, the methods for performing ground plane orientation calculations and calculating camera orientations as described in reference to FIGS. 2, 3 and 4 may be automatically applied at this time (i.e., when the 3D object is specified but before the camera position is calculated) if they were not performed before the 3D objects was selected.

Figure 6E:
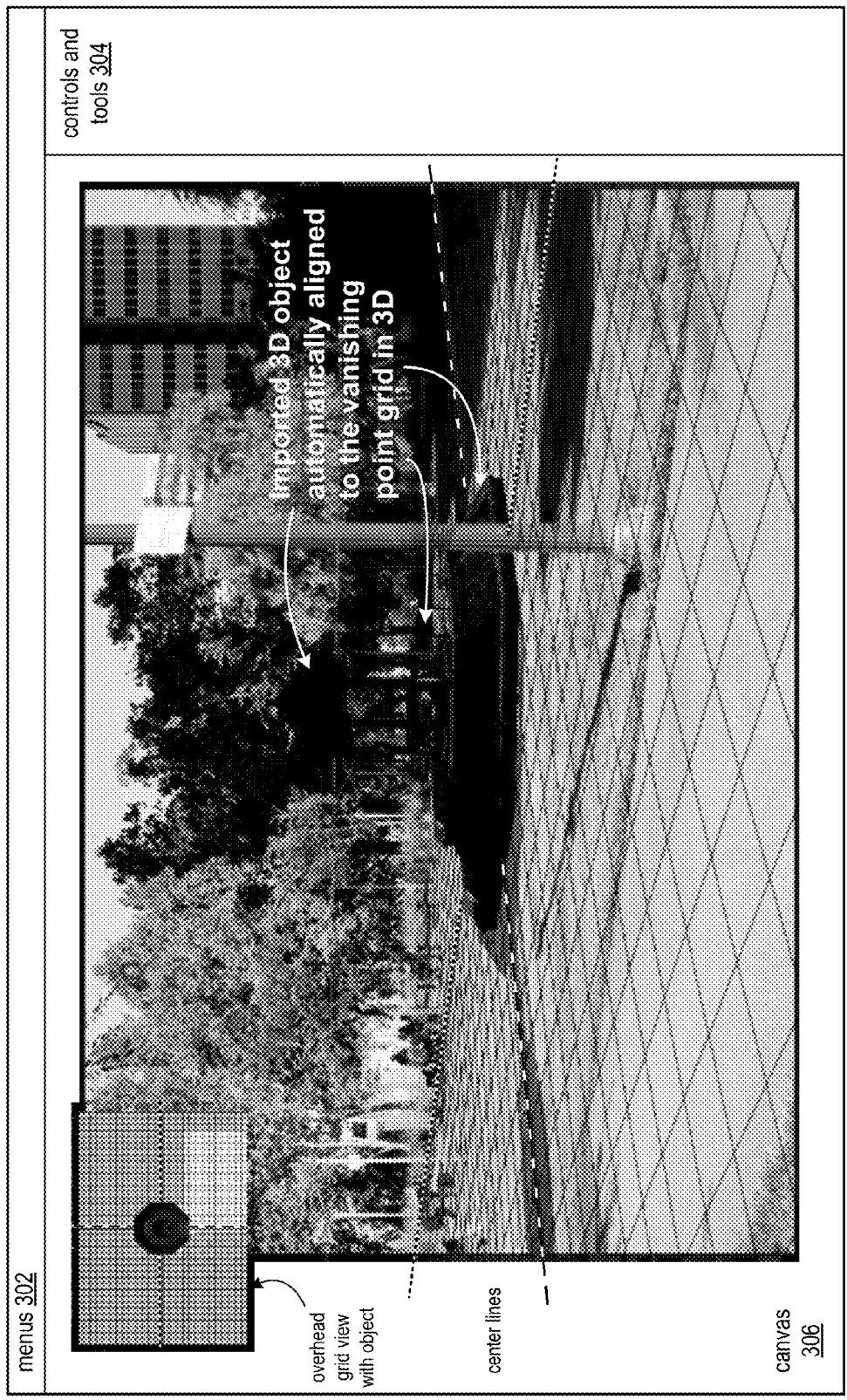

After calculating the camera position, the 3D object may be added to the image and displayed in the scene according to the camera position. In at least some embodiments, the 3D object may be added as a layer in a layer stack of the image. FIG. 6E shows that the image from FIG. 6A now includes an imported 3D object that has been automatically aligned to the vanishing point grid 320 in 3D space as described herein. The dotted and dashed lines show the centerlines of the grid 320. In at least some embodiments, an overhead grid view may be displayed. In at least some embodiments, after the 3D object has been added to the image, the user may use one or more user interface elements to adjust and/or edit the object. For example, the user may rotate (in 3D) or move the object to another location on the ground plane calculated from the grid via the user interface.

Figure 6F:
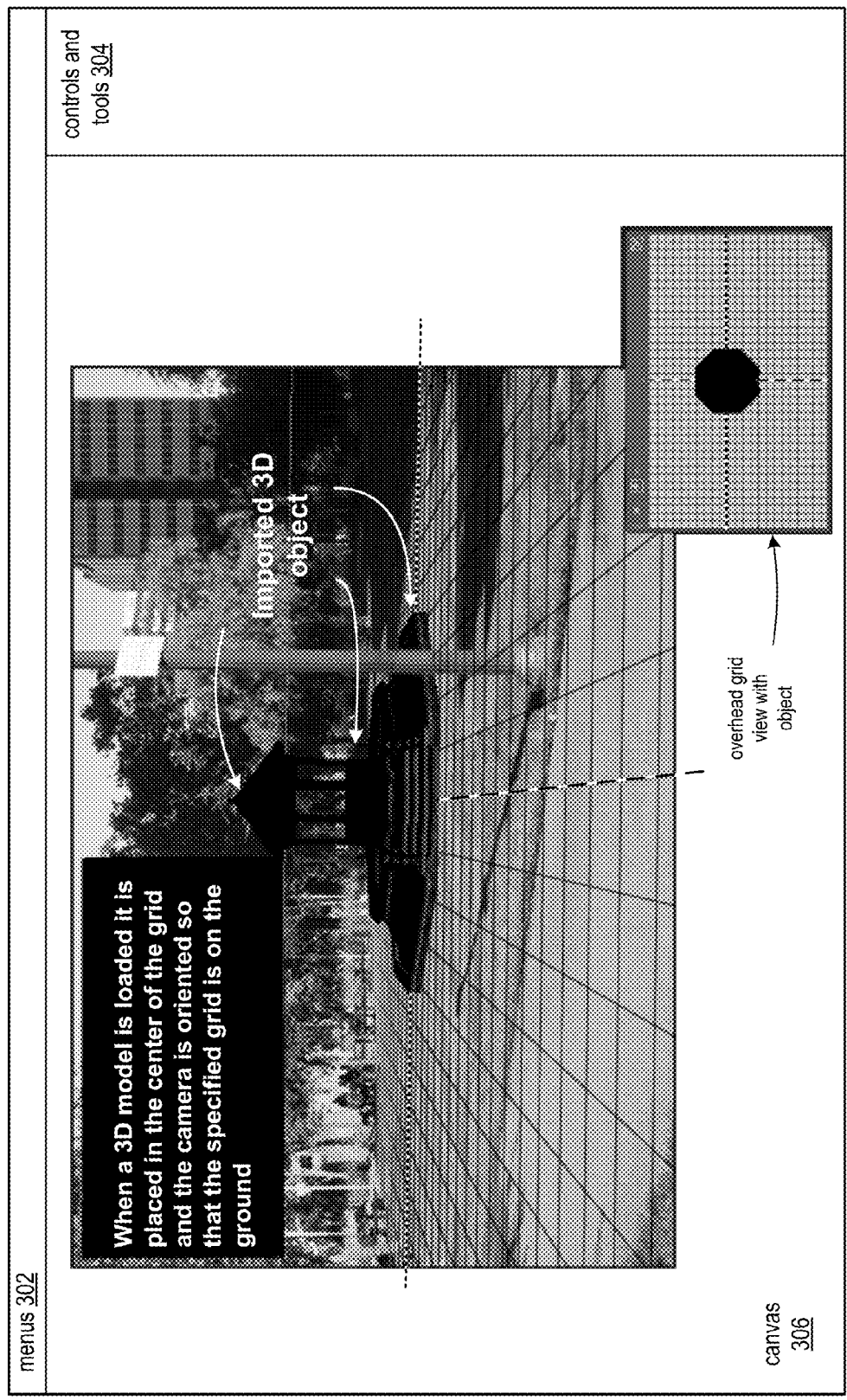

FIG. 6F shows another example resulting image similar to FIG. 6E. However, in this example, the vanishing point grid was aligned differently than the example in FIG. 6E. As can be seen in FIGS. 6E and 6F, when the 3D model is loaded into the image, it is placed in the center of the grid, and the camera is oriented so that the specified grid is on the ground.

Figure 7:
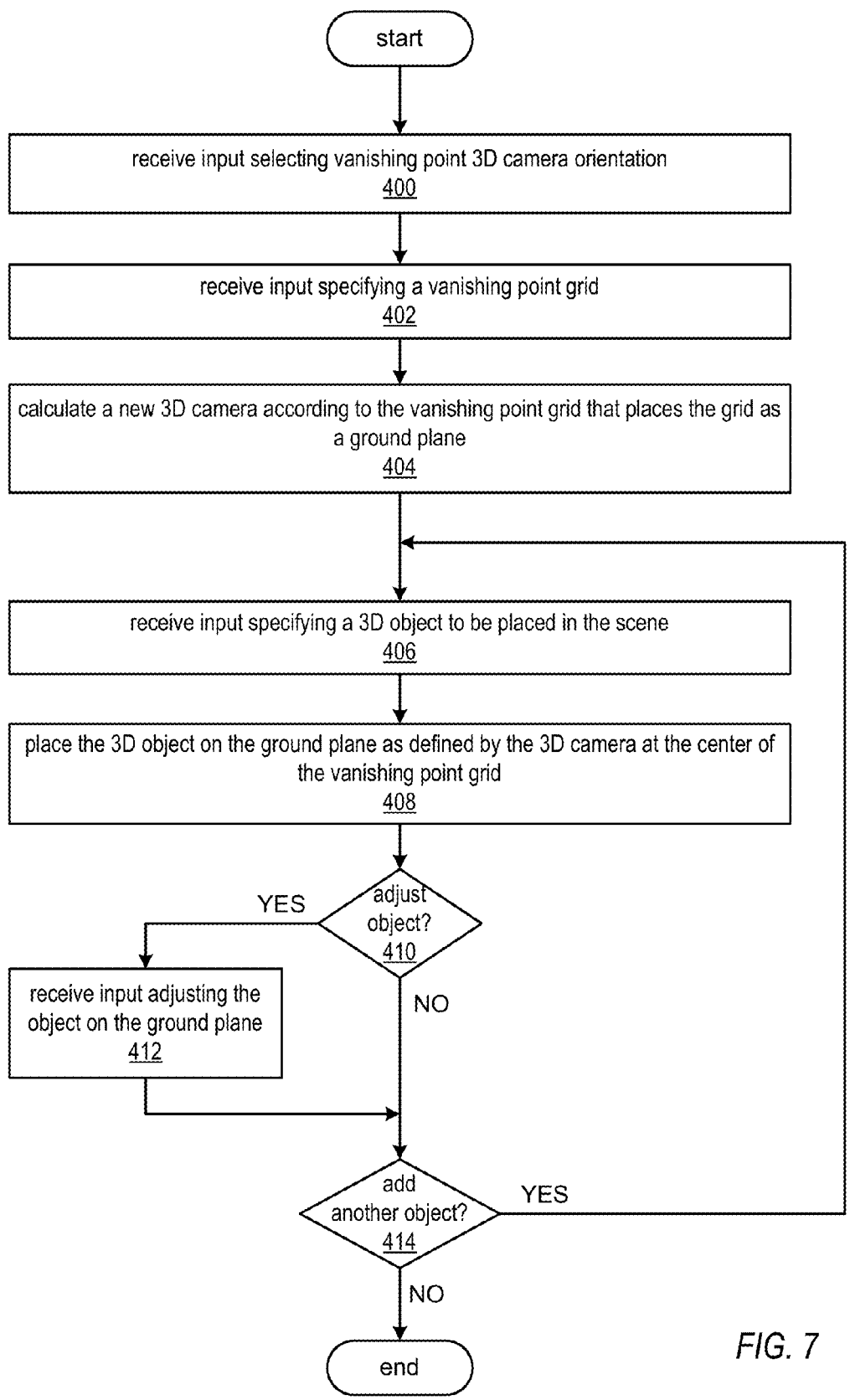
FIG. 7 is a flowchart of an example workflow method for applying embodiments of the methods for 3D camera positioning using a 2D vanishing point grid, according to at least some embodiments.

FIG. 7 is a flowchart of an example workflow for applying embodiments of the methods for 3D camera positioning using a 2D vanishing point grid, according to at least some embodiments. This workflow may, for example, be implemented according to an example user interface as illustrated in FIGS. 6A through 6F.

As indicated at 400, input may be received selecting a "vanishing point" 3D camera orientation. As indicated at 402, additional input may be received specifying a vanishing point grid. As indicated at 404, a new 3D camera may be calculated according to the vanishing point grid that places the grid as a ground plane. In at least some embodiments, the methods as described in reference to FIGS. 3 and 4 may be automatically applied at this time to perform ground plane orientation calculations and calculate camera orientations. As indicated at 406, additional input may be received specifying a 3D object to be placed in the scene. As indicated at 408, the 3D object may then be automatically placed on the ground plane as defined by the 3D camera at the center of the vanishing point grid. In at least some embodiments, the methods as described in reference to FIG. 5 may be automatically applied at this time to calculate the camera position. The 3D object may be appropriately added to and displayed in the image, for example as shown in FIGS. 6E and 6F.

The user may desire to adjust the positioning of the 3D object in the scene (e.g., move or rotate the object). At 408, if the user wants to adjust the 3D object in the scene, input may be received to adjust the 3D object on the ground plane, for example input rotating or moving the object on the ground plane, as indicated at 410.

At 414, if the user wants to add another 3D object, then the method may return to 406. Otherwise, the workflow is done. Output is the input scene with one or more 3D objects added to the image, each oriented according to a ground plane as described herein. In at least some embodiments, each object may be added as a separate layer to the image. Alternatively, two or more objects may be added to the same layer.

While not shown, in at least some embodiments, input may also be received indicating a specified up-vector convention (Y-up or Z-up) that may be used to determine whether the ground plane is in XZ plane or in XY plane, respectively.

Example Implementations

Some embodiments may include a means for computing approximate camera position for a 3D space using a vanishing point grid as a facilitator, and for positioning 3D objects in the space, as described herein. For example, a module or modules of an application may receive input including but not limited to a vanishing point grid and initial camera parameters and, based on the input, perform ground plane orientation calculations, compute camera orientations, and calculate a camera position according to one or more conventions, as described herein. The module or modules may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input including but not limited to a vanishing point grid and initial camera parameters, calculating ground plane orientation, computing camera orientations, and calculating a camera position, as described herein. Other embodiments of the module or modules may be at least partially implemented by hardware circuitry and/or firmware stored, for example, in a non-volatile memory.

Figure 8:
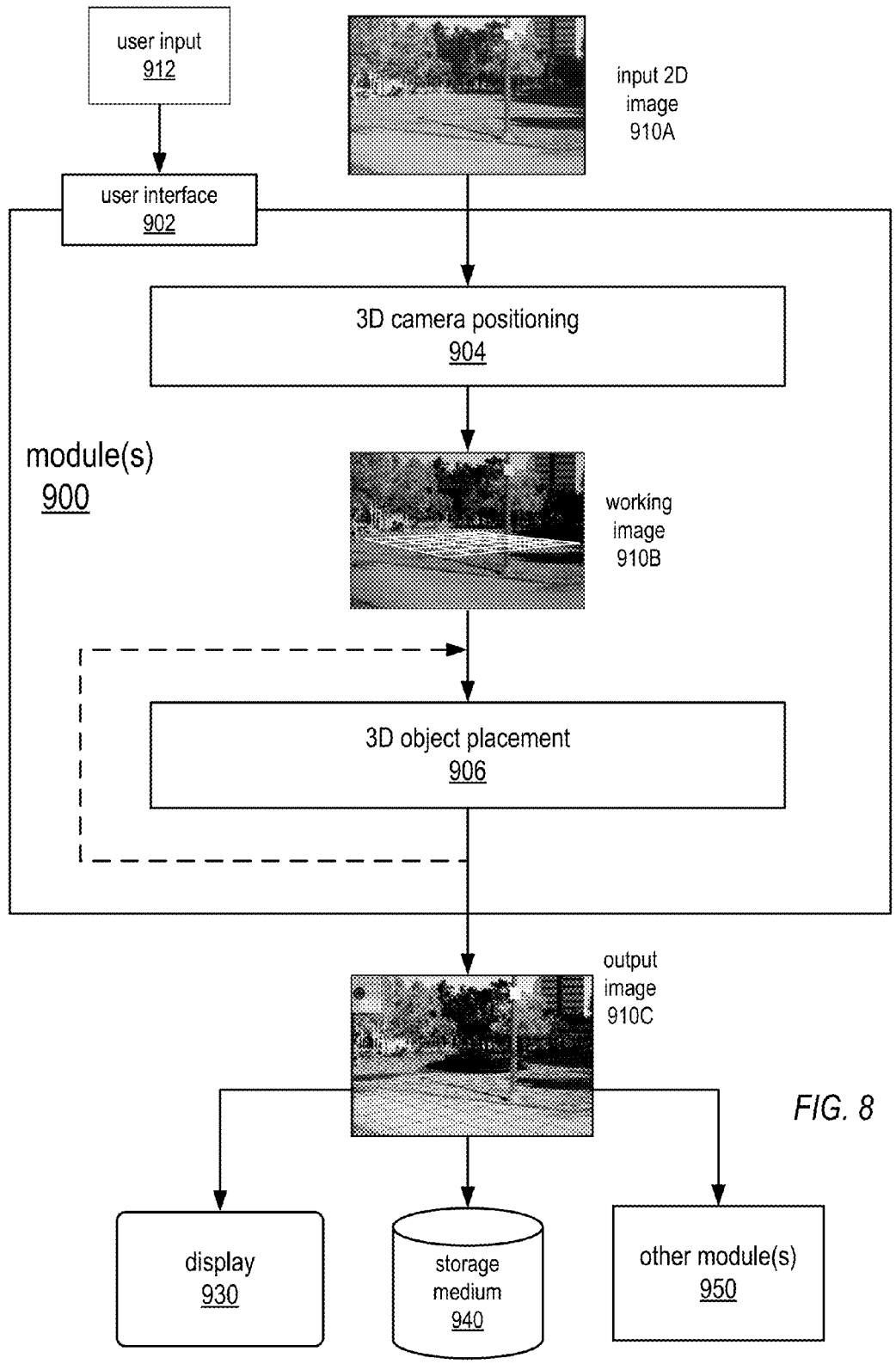
FIG. 8 illustrates an example module or modules that may implement methods for 3D camera positioning using a 2D vanishing point grid, according to at least some embodiments.
Figure 9:
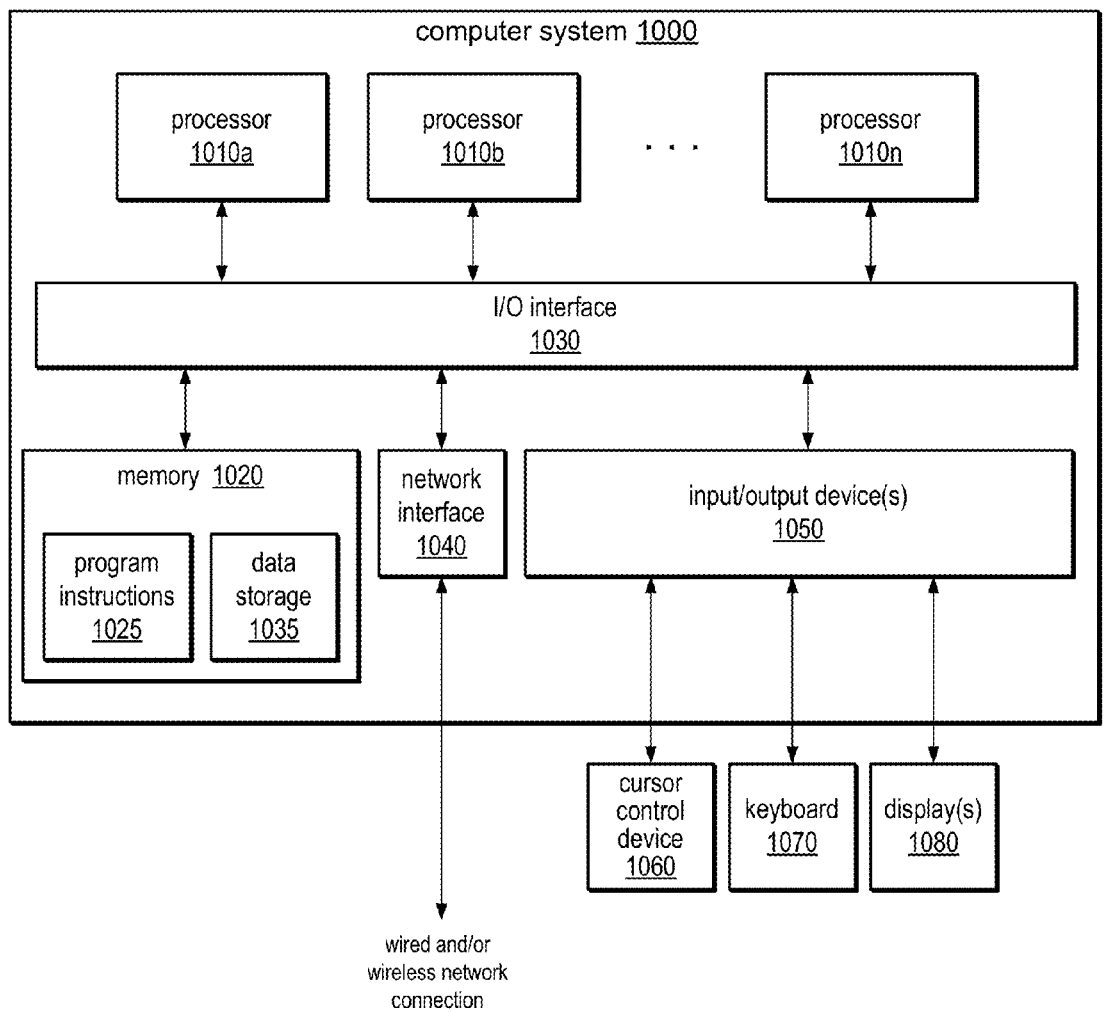
FIG. 9 illustrates an example computer system that may be used in embodiments.

FIG. 8 illustrates an example module or modules that may implement one or more of the methods for 3D camera positioning using a 2D vanishing point grid as illustrated in FIGS. 1 through 7. FIG. 9 illustrates an example computer system on which embodiments of module(s) 900 may be implemented. Module(s) 900 receives as input a digital image 910A that displays a scene. Module(s) 900 may receive user input 912 via user interface 902 selecting a vanishing point 3D camera orientation. Module(s) 900 may receive additional user input 912 specifying a 2D vanishing point grid in the scene and selecting a 3D object to add to the scene. In at least some embodiments, module(s) 900 may also receive input indicating a specified up-vector convention (Y-up or Z-up) that may be used to determine whether the ground plane is in XZ plane or in XY plane, respectively. Module(s) 900 performs 3D camera positioning 904 according to the input (e.g., ground plane orientation calculations and camera orientation computations as illustrated in FIGS. 3 and 4) and 3D object placement 906 (e.g., camera position calculation as illustrated in FIG. 5) according to the input and calculations. Elements 904 and 906 may be performed on a working image 910B displayed on a display device, and may involve adding one or more layers to the image 910. Module(s) 900 generates an output image 910C that includes at least one 3D object added to the scene according to the methods described herein. Output image 910C may, for example, be displayed on a display 930 device, stored to a storage medium 940, such as system memory, a disk drive, DVD, CD, etc., and/or passed on to one or more other modules 950 for additional processing.

Embodiments of the module(s) 900 or one or more of the methods for 3D camera positioning using a 2D vanishing point grid as illustrated in FIGS. 1 through 7 may be implemented as plug-in(s) for applications, as library functions, and/or as a stand-alone application. Embodiments of the module or one or more of the methods and algorithms as described herein may be implemented in any image processing application, including but not limited to Adobe® Photo-Shop® Adobe® PhotoShop® Elements®, and Adobe® After Effects®. Adobe, PhotoShop, PhotoShop Elements, and Adobe After Effects are either registered trademarks or trademarks of Adobe Systems Incorporated in the United States and/or other countries.

Example System

Embodiments of the methods for 3D camera positioning using a 2D vanishing point grid as illustrated in FIGS. 1 through 8 may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, pad or tablet device, mainframe computer system, handheld computer, workstation, network computer, a camera, a set top box, a mobile device, a wireless phone, a smart phone, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Computer system 1000 may also include one or more touch- or multitouch-enabled devices as input/output devices, for example a touch-enabled display and/or pad. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the methods for 3D camera positioning using a 2D vanishing point grid as illustrated in FIGS. 1 through 8 are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement embodiments of the methods for 3D camera positioning using a 2D vanishing point grid as illustrated in FIGS. 1 through 8, and data storage 1035, comprising various data accessible by program instructions 1025. In one embodiment, program instructions 1025 may include software elements of embodiments of the methods for 3D camera positioning using a 2D vanishing point grid as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of the methods for 3D camera positioning using a 2D vanishing point grid as described herein. In particular, the computer system and devices may include any combination of hardware or software that can perform the indicated functions, including a computer, personal computer system, desktop computer, laptop, notebook, or netbook computer, pad or tablet device, mainframe computer system, handheld computer, workstation, network computer, a camera, a set top box, a mobile device, network device, internet appliance, PDA, wireless phones, smart phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising
performing, by one or more computing devices:
obtaining a two dimensional (2D) vanishing point grid and initial camera parameters for a 2D scene, the vanishing point grid specified by grid corners of a ground plane;
calculating a three-dimensional (3D) camera according to the vanishing point grid, the 3D camera placing the vanishing point grid as the ground plane in the 2D scene; and
positioning a 3D object on the ground plane of the 2D scene as defined by the 3D camera, the 3D object being a rendered object not previously included in any 2D scene.

2. The method as recited in claim 1, wherein the 3D object is positioned on the ground plane of the 2D scene as defined by the 3D camera at the center of the vanishing point grid.

3. The method as recited in claim 1, wherein said calculating the 3D camera according to the vanishing point grid comprises:
calculating a ground plane orientation of the ground plane according to the vanishing point grid;
computing camera orientations; and
calculating a camera position of the 3D camera.

4. The method as recited in claim 3, wherein said calculating the ground plane orientation comprises:
calculating vanishing point vectors in 3D space;
calculating a vanishing plane normal as an up-vector; and
calculating a new X vector and a new Z vector.

5. The method as recited in claim 3, wherein said computing the camera orientations comprises:
calculating a ground plane transformation matrix with respect to a world-up vector; and
calculating a camera matrix from the ground plane transformation matrix.

6. The method as recited in claim 3, wherein the camera position is calculated according to one or more conventions.

7. The method as recited in claim 6, wherein the one or more conventions include a first convention that the camera should match an original camera position as much as possible, a second convention that the camera should point at the 3D object being rendered, and a third convention that the camera should be positioned so that the ground plane center is visually located at the center of the vanishing point grid.

8. A system, comprising:
at least one processor; and
a memory comprising program instructions that are executable by the at least one processor to:
obtain a two dimensional (2D) vanishing point grid and initial camera parameters for a 2D scene, the vanishing point grid specified by grid corners of a ground plane;
calculate a three-dimensional (3D) camera according to the vanishing point grid, the 3D camera placing the vanishing point grid as the ground plane in the 2D scene; and
position a 3D object on the ground plane of the 2D scene as defined by the 3D camera, the 3D object being a rendered object not previously included in any 2D scene.

9. The system as recited in claim 8, wherein the program instructions are executable to position the 3D object on the ground plane of the 2D scene as defined by the 3D camera at the center of the vanishing point grid.

10. The system as recited in claim 8, wherein, to calculate the 3D camera according to the vanishing point grid, the program instructions are executable to:
calculate a ground plane orientation of the ground plane according to the vanishing point grid;
compute camera orientations; and
calculate a camera position of the 3D camera.

11. The system as recited in claim 10, wherein, to calculate the ground plane orientation, the program instructions are executable to:
calculate vanishing point vectors in 3D space;
calculate a vanishing plane normal as an up-vector; and
calculate a new X vector and a new Z vector.

12. The system as recited in claim 10, wherein, to compute the camera orientations, the program instructions are executable to:
calculate a ground plane transformation matrix with respect to a world-up vector; and
calculate a camera matrix from the ground plane transformation matrix.

13. The system as recited in claim 10, wherein the program instructions are executable to calculate the camera position according to one or more conventions.

14. The system as recited in claim 13, wherein the one or more conventions include a first convention that the camera should match an original camera position as much as possible, a second convention that the camera should point at the 3D object being rendered, and a third convention that the camera should be positioned so that the ground plane center is visually located at the center of the vanishing point grid.

15. A non-transitory computer-readable storage medium storing program instructions that are computer-executable comprising to implement:
    obtaining a two dimensional (2D) vanishing point grid and initial camera parameters for a 2D scene, the vanishing point grid specified by grid corners of a ground plane;
    calculating a three-dimensional (3D) camera according to the vanishing point grid, the 3D camera placing the vanishing point grid as the ground plane in the 2D scene; and
    positioning a 3D object on the ground plane of the 2D scene as defined by the 3D camera, the 3D object being a rendered object not previously included in any 2D scene.

16. The non-transitory computer-readable storage medium as recited in claim 15, wherein the program instructions are computer-executable to implement positioning the 3D object on the ground plane of the 2D scene as defined by the 3D camera at the center of the vanishing point grid.

17. The non-transitory computer-readable storage medium as recited in claim 15, wherein, in said calculating the 3D camera according to the vanishing point grid, the program instructions are computer-executable to implement:
    calculating a ground plane orientation of the ground plane according to the vanishing point grid;
    computing camera orientations; and
    calculating a camera position of the 3D camera.

18. The non-transitory computer-readable storage medium as recited in claim 17, wherein, in said calculating the ground plane orientation, the program instructions are computer-executable to implement:
    calculating vanishing point vectors in 3D space;
    calculating a vanishing plane normal as an up-vector; and
    calculating a new X vector and a new Z vector.

19. The non-transitory computer-readable storage medium as recited in claim 17, wherein, in said computing the camera orientations, the program instructions are computer-executable to implement:
    calculating a ground plane transformation matrix with respect to a world-up vector; and
    calculating a camera matrix from the ground plane transformation matrix.

20. The non-transitory computer-readable storage medium as recited in claim 17, wherein the program instructions are computer-executable to implement calculating the camera position according to one or more conventions that include a first convention that the camera should match an original camera position as much as possible, a second convention that the camera should point at the 3D object being rendered, and a third convention that the camera should be positioned so that the ground plane center is visually located at the center of the vanishing point grid.

* * * * *